United States Patent
Shen et al.

(10) Patent No.: US 7,101,585 B2
(45) Date of Patent: *Sep. 5, 2006

(54) ULTRA HIGH PRESSURE HOMOGENIZATION PROCESS FOR MAKING A STABLE PROTEIN BASED ACID BEVERAGE

(75) Inventors: Cheng Shen, Kirkwood, MO (US); Thomas J. Wagner, Hillsboro, MO (US)

(73) Assignee: Solae, LLC, St. Louis, MO (US)

(*) Notice: Subject to any disclaimer, the term of this patent is extended or adjusted under 35 U.S.C. 154(b) by 88 days.

This patent is subject to a terminal disclaimer.

(21) Appl. No.: 10/825,445

(22) Filed: Apr. 15, 2004

(65) Prior Publication Data

US 2005/0233053 A1   Oct. 20, 2005

(51) Int. Cl.
*A23J 1/00*   (2006.01)
*A23J 1/14*   (2006.01)

(52) U.S. Cl. ............... 426/656; 426/590; 426/598

(58) Field of Classification Search ........... 426/656, 426/590, 598
See application file for complete search history.

(56) References Cited

U.S. PATENT DOCUMENTS

| | | | |
|---|---|---|---|
| 4,039,696 A * | 8/1977 | Marquardt et al. | 426/598 |
| 4,946,702 A | 8/1990 | Stipp et al. | |
| 4,961,953 A | 10/1990 | Singer et al. | |
| 5,232,726 A | 8/1993 | Clark et al. | |
| 5,286,511 A | 2/1994 | Klavons et al. | |
| 5,658,609 A * | 8/1997 | Abboud et al. | 426/609 |
| 5,994,414 A | 11/1999 | Franco et al. | |
| 6,180,159 B1 | 1/2001 | Villagran et al. | |
| 6,207,215 B1 | 3/2001 | Wilson et al. | |
| 6,221,419 B1 | 4/2001 | Gerrish | |
| 6,231,908 B1 | 5/2001 | Lelieveld et al. | |
| 6,303,160 B1 * | 10/2001 | Laye et al. | 426/36 |
| 6,696,084 B1 | 2/2004 | Pace et al. | |
| 6,861,080 B1 * | 3/2005 | Kent et al. | 426/36 |
| 2002/0127325 A1 | 9/2002 | Gandhi et al. | |
| 2004/0258827 A1 * | 12/2004 | Shen | 426/598 |
| 2005/0202147 A1 * | 9/2005 | Wong et al. | 426/598 |

OTHER PUBLICATIONS

A. Apichartsrangkoon "Effects of High Pressure on Rheological Properties of Soy Protein Gels" Food Chemistry 80 (2003) 55-60; May 22, 2002.

* cited by examiner

*Primary Examiner*—Anthony Weier
(74) *Attorney, Agent, or Firm*—James L. Cordek; Holly M. Amjad; Cary A. Levitt (57) ABSTRACT

This invention is directed to a process for preparing a stable suspension of an acid beverage, wherein a hydrated protein stabilizing agent (A) and a flavoring material (B) are combined as a preblend (I) and combined with either a slurry of a homogenized protein material (C) or a homogenized preblend (II) of a hydrated protein stabilizing agent (A) and a slurry of a protein material (C) to form a blend and pasteurizing and homogenizing the blend wherein the homogenization of the blend is carried out in two stages comprising a high pressure stage of from 8000–30,000 pounds per square inch and a low pressure stage of from 300–1000 pounds per square inch; wherein the acid beverage composition has a pH of from 3.0 to 4.5.

59 Claims, 3 Drawing Sheets

ULTRA HIGH PRESSURE HOMOGENIZATION PROCESS FOR MAKING A STABLE PROTEIN BASED ACID BEVERAGE

FIELD OF THE INVENTION

This invention relates to a process for preparing a protein based acid beverage by the use of an ultra high pressure homogenization which causes the formation of smaller particles. The acid beverage obtained is smooth, tasteful, palatable and has good storage stability.

BACKGROUND OF THE INVENTION

The use of vegetable protein, especially soy protein, is receiving greater attention due to its health benefit claims. There is an increased interest to develop technology to incorporate soy protein into juice type acid beverages. The concern, however, is the suspendibility of soy protein in acidic beverages at or near its isoelectric point where the solubility of soy protein is at a minimum. Soy protein will naturally precipitate over time due to gravitational forces based on Stokes' Law. The rate of the formed sediment is proportional to the diameter of the soy protein, coupled with the viscosity of the acid beverage. High viscosity and smaller particles will suppress the development of sediment. A process method, in addition to the use of a stabilizer, will greatly suppress the rate of sediment formation. The processing method employed is homogenization of the fully formulated acid beverage by the use of an ultra high pressure homogenization of up to 30,000 pounds per square inch Stokes' Law is an equation relating the terminal settling velocity of a smooth, rigid sphere in a viscous fluid of known density and viscosity to the diameter of the sphere, when subjected to a known force. Stokes' Law will correctly predict that for two small steel balls, one having a radius exactly twice the other, the bigger ball will fall through a fluid of known viscosity four times faster than the smaller ball does through a fluid of the same viscosity. The bigger ball has eight times the weight and twice the drag force for the same velocity, and the drag force is proportional to the velocity.

Juices and other acidic juice-like beverages are popular commercial products. Consumer demand for nutritional healthy beverages has led to the development of nutritional juice or juice-like beverages containing protein. The protein provides nutrition in addition to the nutrients provided by the components of the beverage. Recently it has been discovered that certain proteins have specific health benefits beyond providing nutrition. For example, soy protein has been recognized by the United States Food and Drug Administration as being effective to lower blood cholesterol concentrations in conjunction with a healthy diet. In response, there has been a growing consumer demand for acidic juice-like beverages containing proteins that provide such specific health benefits.

A hurdle to adding protein to acidic beverages, however, is the relative insolubility of proteins in an aqueous acidic environment. Most commonly used proteins, such as soy proteins and casein, have an isoelectric point at an acidic pH. Thus, the proteins are least soluble in an aqueous liquid at or near the pH of acidic beverages. For example, soy protein has an isoelectric point at pH 4.5 and casein has an isoelectric point at a pH of 4.7, while most common juices have a pH in the range of 3.7 to 4.0. As a result, protein tends to settle out as a sediment in an acidic protein-containing beverage-an undesirable quality in a beverage.

Protein stabilizing agents that stabilize proteins as a suspension in an aqueous acidic environment are used to overcome some of the problems presented by protein insolubility. Pectin is a commonly used protein stabilizing agent.

Pectin, however, is an expensive food ingredient, and manufacturers of aqueous acidic beverages containing protein desire less expensive stabilizers, where the amount of required pectin is either reduced or removed in favor of less expensive stabilizing agents.

U.S. Pat. No. 5,232,726 (Clark et al., Aug. 3, 1993) relates to a method for extending the shelf life of juices, particularly citrus juice such as orange juice, without pasteurization, by subjecting the juice to an ultra high pressure homogenization step of 15,000 pounds per square inch or greater.

U.S. Pat. No. 5,286,511 (Klavons et al., Feb. 15, 1994) provides a beverage such as orange juice that is clouded by a suspension of soy protein particles, where the protein particles are prevented from aggregating to the point of settling out by pectin. Pectin inhibits the protein from settling by adsorbing to individual protein particles and imparting an overall negative charge to the protein particles, resulting in repulsion of the particles from one another, and thereby preventing the protein particles from aggregating and settling out of the suspension. Pectin also increases the viscosity of the beverage, which helps stabilize protein particles against gravitational forces.

U.S. Pat. No 6,696,084 (Pace et al., Feb. 24, 2004) relates to a spray drying process for the preparation of pharmaceutical compositions containing small particles of phospholipid-stabilized fenofibrate. Prior to spray drying, a heated suspension of molten fenofibrate is subjected to a two stage homogenization. The first pressure stage is from 2000 to 30,000 pounds per square inch.

U.S. Pat. No 6,221,419 (Gerrish, Apr. 24, 2001) relates to a pectin for stabilizing proteins particularly for use in stabilizing proteins present in aqueous acidified milk drinks. It must be understood that the inclusion of pectin has both desirable and undesirable effects on the properties of acidified milk drinks. While pectin can act as a stabilizer against sedimentation of casein particles or whey separation, it can have the disadvantage of increasing the viscosity of the drink due to its cross-linking with naturally co-present calcium cations rendering the drink unpalatable. It will be seen that in the absence of pectin, there is significant sedimentation in the case of both drinks caused by the instability of the casein particles which also results in relatively high viscosity. After a certain concentration of pectin has been added, the casein particles become stabilized against sedimentation after which increasing the pectin concentration has little effect on sedimentation. Turning to the viscosity of the drinks, this also significantly drops on stabilisation of the casein particles but then almost immediately begins to rise again due to cross-linking of the excess pectin added by the co-present calcium cations. This increased viscosity is undesirable as it leads to the beverage having poor organoleptic properties. This range may be as narrow as only 0.06% by weight of pectin based upon the beverage weight as a whole. Below this working range, sedimentation is a significant problem, whereas above it, the viscosity of the beverage is undesirably high.

SUMMARY OF THE INVENTION

This invention is directed to a process for preparing a stable suspension of a protein material in an acidic beverage, comprising;

forming a preblend (I) by mixing
(A) a hydrated protein stabilizing agent and
(B) at least one flavoring material comprising a fruit juice, a vegetable juice, citric acid, malic acid, tartaric acid, lactic acid, ascorbic acid, glucono delta lactone or phosphoric acid; and mixing preblend (I) and
(C) a hydrated and homogenized protein material slurry wherein the homogenization is carried out in two stages comprising a high pressure stage of from 1500–5000 pounds per square inch and a low pressure stage of from 300–1000 pounds per square inch; to form a blend; and pasteurizing and homogenizing the blend wherein the homogenization of the blend is carried out in two stages comprising a high pressure stage of from 8000–30,000 pounds per square inch and a low pressure stage of from 300–1000 pounds per square inch;

wherein the acid beverage composition has a pH of from 3.0 to 4.5.

In a second embodiment, the invention is directed to a process for preparing a stable suspension of a protein material in an acidic beverage, comprising;

forming a preblend (I) by mixing
(A) a hydrated protein stabilizing agent and
(B) at least one flavoring material comprising a fruit juice, a vegetable juice, citric acid, malic acid, tartaric acid, lactic acid, ascorbic acid, glucono delta lactone or phosphoric acid; and forming a preblend (II) by mixing
(A) a hydrated protein stabilizing agent; and
(C) a hydrated and homogenized protein material slurry wherein the homogenization is carried out in two stages comprising a high pressure stage of from 1500–5000 pounds per square inch and a low pressure stage of from 300–1000 pounds per square inch; and mixing preblend (I) and preblend (II) to form a blend; and
pasteurizing and homogenizing the blend wherein the homogenization of the blend is carried out in two stages comprising a high pressure stage of from 8000–30,000 pounds per square inch and a low pressure stage of from 300–1000 pounds per square inch;

wherein the acid beverage composition has a pH of from 3.0 to 4.5.

DETAILED DESCRIPTION OF THE INVENTION

Figure 1:
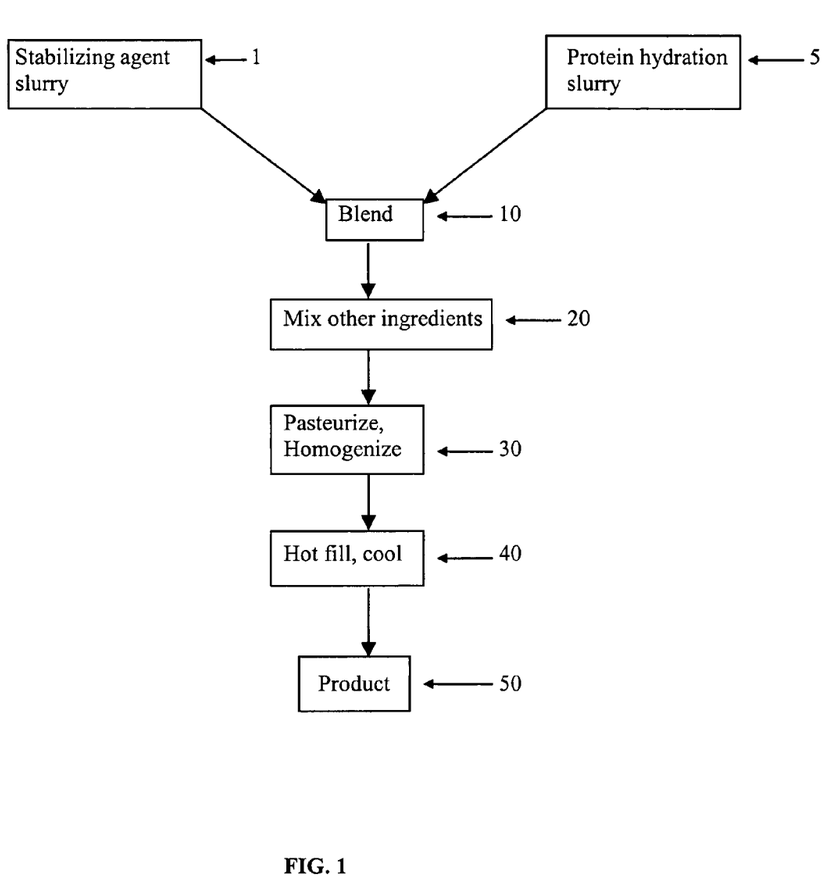
FIG. 1 is a block flow diagram of an industry wide process for producing a typical protein containing acid beverage wherein a dry protein is hydrated as a protein slurry and a dry stabilizing agent is hydrated as a stabilizing agent slurry and the two slurries are blended together and the remaining ingredients added followed by pasteurization and homogenization.

A protein based acid beverage is normally stabilized by a stabilizing agent that provides a stable suspension through possible steric stabilization and electrostatic repulsive mechanism. FIG. 1 refers to the normal processing conditions of protein stabilized acid beverages. At 1, a stabilizing agent is either hydrated separately into a 2–3% slurry or blended with sugar to give a stabilizing agent slurry having a pH of 3.5. At 5, dry protein powder is first dispersed in water at ambient temperature and hydrated at an elevated temperature for a period of time. The pH at 5 is about neutral. The hydrated stabilizing agent slurry from 1 and the hydrated protein slurry from 5 are mixed together at 10 for 10 minutes under agitation. The pH at 10 is about 7. Other ingredients such as additional sugar, fruit juices or vegetable juice, and various acids such as phosphoric acid, ascorbic acid citric acid, etc., are added at 20 to bring the pH to about 3.8. The contents are pasteurized at 195° F. for 30 seconds and then homogenized first at 2500 pounds per square inch and then at 500 pounds per square inch at 30. Containers are hot filled and cooled at 40 to give the product at 50 with a pH of 3.8. The problem with this method is that after the stabilizing agent is mixed with the protein, the pH of the blend is close to neutral, and the stabilizing agent is potentially degraded by beta-elimination, especially under heat. This causes a decrease in the molecular weight of the stabilizing agent and the ability of the stabilizing agent to stabilize the proteins when the pH is later lowered even more is greatly reduced. The stabilizing agent is only stable at room temperature. As the temperature increases, beta elimination begins, which results in chain cleavage and a very rapid loss of the ability of the stabilizing agent to provide a stable suspension.

Figure 2:
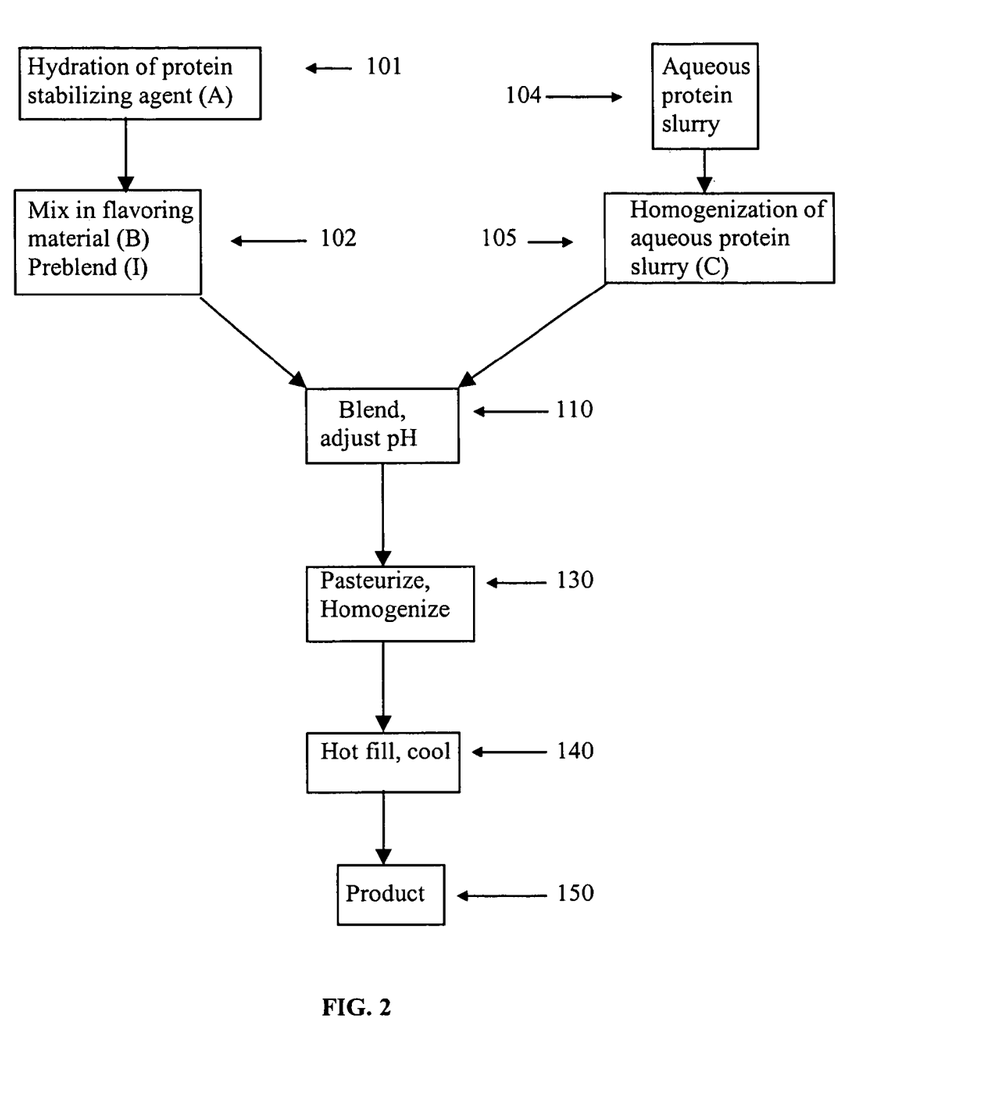
FIG. 2 is a block flow diagram of one embodiment of the invention for producing a protein containing acid beverage wherein a dry stabilizing agent is hydrated as a stabilizing agent slurry and a flavoring material added to the stabilizing agent slurry to form a preblend (I) slurry. A protein slurry is hydrated and homogenized to form Component (C). The preblend (I) slurry and Component (C) are blended together followed by pasteurization and homogenization in accordance with the principles of the invention.
Figure 3:
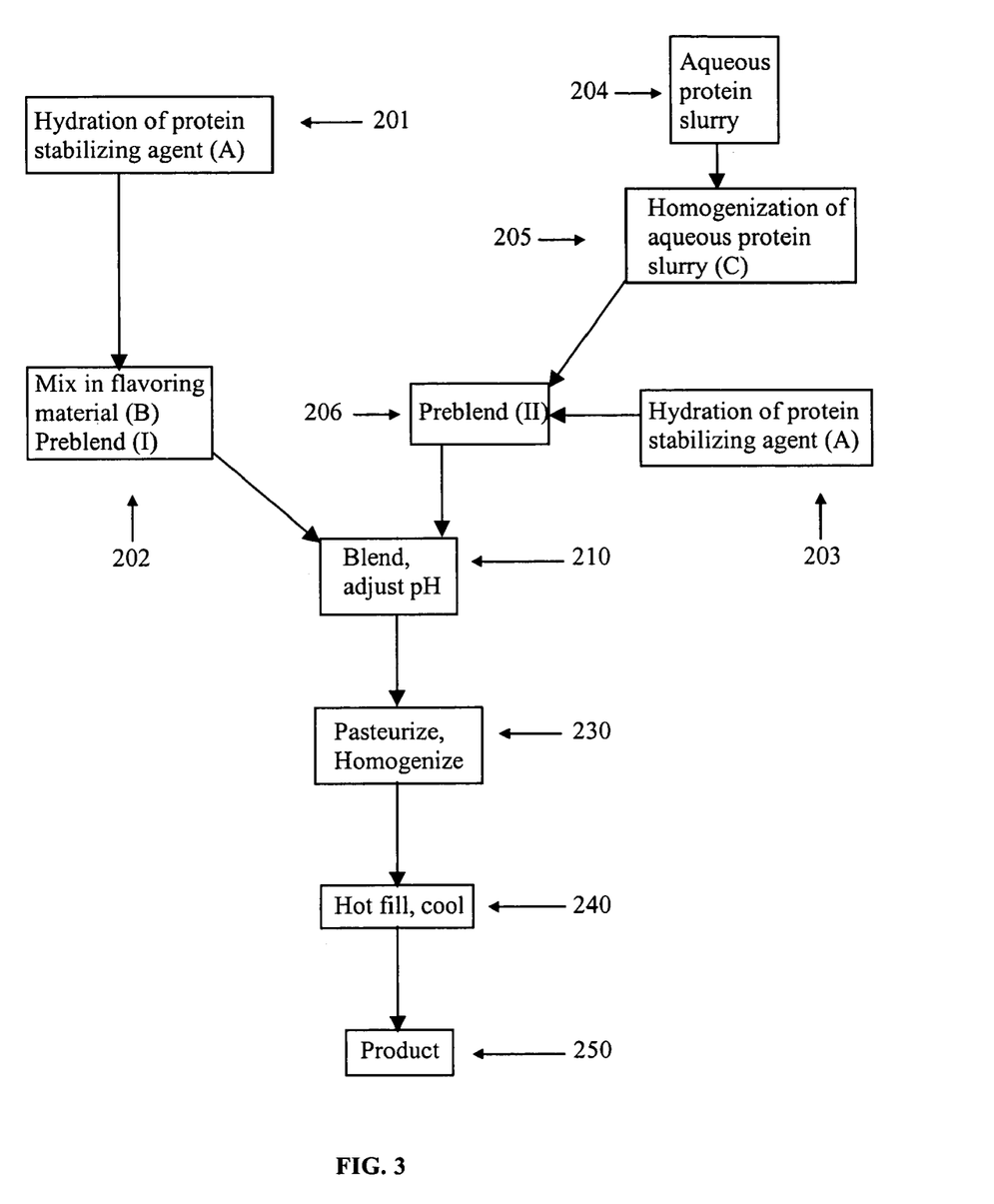
FIG. 3 is a block flow diagram of another embodiment of the invention for producing a protein containing acid beverage wherein a dry stabilizing agent is hydrated as a stabilizing agent slurry and a flavoring material is added to the stabilizing agent slurry to form a preblend (I) slurry and a dried protein is hydrated to a protein slurry and a dry stabilizing agent is added and homogenized to form a preblend (II) slurry. The preblend (I) slurry and the preblend (II) slurry are blended together followed by pasteurization and homogenization in accordance with the principles of the invention.

In the present invention, a hydrated protein stabilizing agent (A) and a flavoring material (B) are combined as a preblend (I) and combined with either a slurry of a homogenized protein material (C) or a homogenized preblend (II) of a hydrated protein stabilizing agent (A) and a slurry of a protein material (C). FIG. 2 and FIG. 3 refer to the processing conditions of the present invention.

FIG. 2 outlines the first process of this invention. A stabilizing agent is hydrated into a 0.5–10% dispersion with or without sugar at 101. The pH at 101 is 3.5. At 102, the flavoring material (B) such as additional sugar, fruit juices, vegetable juices, various acids such as phosphoric acid, ascorbic acid, citric acid, etc. are added and the contents mixed at an elevated temperature to form preblend (I). A protein slurry is prepared at 104 from a dry protein material. The slurry is homogenized at 105 to give component (C), wherein the homogenization is carried out in two stages comprising a high pressure stage of from 1500–5000 pounds per square inch and a low pressure stage of from 300–1000 pounds per square inch. The pH at 105 is about neutral. The homogenized slurry from 5 and preblend (I) from 102 are blended together at 110 with additional acid to a pH of 3.8. At 130, the contents are pasteurized at a temperature of 180° F. for 30 seconds and homogenized in two stages—a high pressure stage of from 8000–30,000 pounds per square inch and a low pressure stage of from 300–1000 pounds per square inch. Containers are hot filled and cooled at 140 to give the product at 150 with a pH of 3.8.

FIG. 3 outlines the second process of this invention. In FIG. 3, a stabilizing agent is hydrated into a 0.5–10% dispersion with or without sugar at 201. The pH at 201 is 3.5. At 202, the flavoring material (B) such as additional sugar, fruit juices, vegetable juices, various acids such as phosphoric acid, ascorbic acid, citric acid, etc. are added and the contents mixed at an elevated temperature to form preblend (I). A protein slurry from a dry protein material is hydrated at 204 and homogenized at 205, wherein the homogenization is carried out in two stages comprising a high pressure stage of from 1500–5000 pounds per square inch and a low pressure stage of from 300–1000 pounds per square inch. The pH at 205 is about neutral. A stabilizing agent slurry is prepared at 203 and combined with the homogenized slurry from 205 to give preblend (II) at 206. Preblend (I) from 202 and preblend (II) from 206 are blended together at 210 with additional acid to a pH of 3.8. At 230, the contents are pasteurized at a temperature of 180° F. for 30 seconds and homogenized in two stages—a high pressure stage of from 8000–30,000 pounds per square inch and a low pressure stage of from 300–1000 pounds per square inch. Containers are hot filled and cooled at 240 to give the product at 250 with a pH of 3.8.

Component (A)

The present invention employs a stabilizing agent and the stabilizing agent is a hydrocolloid comprising alginate, microcrystalline cellulose, jellan gum, tara gum, carrageenan, guar gum, locust bean gum, xanthan gum, cellulose gum and pectin. A preferred hydrocolloid is pectin. As used herein, the term "pectin" means a neutral hydrocolloid that consists mainly of partly methoxylated polygalacturonic acid. The term "high methoxyl pectin" as used herein means a pectin having a degree of methoxyl esterification of fifty percent (50%) or greater. High methoxyl (HM) pectins useful in the present invention are commercially available. One supplier is Copenhagen Pectin A/S, a division of Hercules Incorporated, DK-4623, Lille Skensved, Denmark. Their products are identified as Hercules YM100L, Hercules YM100H, Hercules YM115L, Hercules YM115H and Hercules YM150H. Hercules YM100L contains about 56% galacturonic acid, where about 72% (±2%) of the galacturonic acid is methylated. Another supplier is Danisco A/S of Copenhagen, Denmark and they supply AMD783.

It is necessary to hydrate the stabilizing agent (A), prior to preparing the acid beverage. Water is added in sufficient quantity to form a slurry in order to hydrate the stabilizing agent. The slurry is mixed at room temperature under high shear and heated to 140–180° F. for an additional 10 minutes. At this solids concentration, the most complete hydration is obtained in the stabilizing agent. Thus, the water in the slurry is used most efficiently at this concentration. A sweetener may be added at this point or later or a portion of the sweetener added here and also added later. Preferred sweeteners comprise sucrose, corn syrup, and may include dextrose and high fructose corn syrup and artificial sweeteners.

Component (B)

A protein material by itself can have an undesired aftertaste or undesired flavors. The function of the flavoring material (B) is to mask any adverse flavors of the protein material (C) and to give a pleasant taste to the acid beverage composition. The flavoring material (B) comprises a fruit juice, a vegetable juice, citric acid, malic acid, tartaric acid, lactic acid, ascorbic acid, glucone delta lactone, phosphoric acid or combinations thereof.

As a juice, the fruit and/or vegetable may be added in whole, as a liquid, a liquid concentrate, a puree or in another modified form. The liquid from the fruit and/or vegetable may be filtered prior to being used in the juice product. The fruit juice can include juice from tomatoes, berries, citrus fruit, melons and/or tropical fruits. A single fruit juice or fruit juice blends may be used. The vegetable juice can include a number of different vegetable juices. Examples of a few of the many specific juices which may be utilized in the present invention include juice from berries of all types, currants, apricots, peaches, nectarines, plums, cherries, apples, pears, oranges, grapefruits, lemons, limes, tangerines, mandarin, tangelo, bananas, pineapples, grapes, tomatoes, rhubarbs, prunes, figs, pomegranates, passion fruit, guava, kiwi, kumquat, mango, avocados, all types of melon, papaya, turnips, rutabagas, carrots, cabbage, cucumbers, squash, celery, radishes, bean sprouts, alfalfa sprouts, bamboo shoots, beans and/or seaweed. As can be appreciated, one or more fruits, one or more vegetables, and/or one or more fruits and vegetables, can be included in the acid beverage to obtain the desired flavor of the acid beverage.

Fruit and vegetable flavors can also function as the flavoring material (B). Fruit flavoring has been found to neutralize the aftertaste of protein materials. The fruit flavoring may be a natural and/or artificial flavoring. As can be appreciated, the fruit flavoring is best when used with other flavoring materials such as vegetable flavoring to enhance the characterizing flavor of the acid beverage and also to mask any undesirable flavor notes that may derive from the protein material.

Component (C)

The protein material of the process of the present invention may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. As used herein a "partially insoluble" protein material is a protein material that contains at least 10% insoluble material, by weight of the protein material, at a specified pH. Preferred protein materials useful in the composition of the present invention include soy protein materials, casein or caseinates, corn protein materials—particularly zein, and wheat gluten. Preferred proteins also include dairy whey protein (especially sweet dairy whey protein), and non-dairy-whey proteins such as bovine serum albumin, egg white albumin, and vegetable whey proteins (i.e., non-dairy whey protein) such as soy protein.

Soybean protein materials which are useful with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

The soy flour, soy concentrate and soy protein isolate are described below as containing a protein range based upon a "moisture free basis" (mfb).

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 49% to about 65% on a moisture free basis (mfb). Preferably the flour is very finely ground, most preferably so that less than about 1% of the flour is retained on a 300 mesh (U.S. Standard) screen.

Soy concentrate, as the term is used herein, refers to a soy protein material containing about 65% to about 72% of soy protein (mfb). Soy concentrate is preferably formed from a commercially available defatted soy flake material from which the oil has been removed by solvent extraction. The soy concentrate is produced by an acid leaching process or by an alcohol leaching process. In the acid leaching process, the soy flake material is washed with an aqueous solvent having a pH at about the isoelectric point of soy protein, preferably at a pH of about 4.0 to about 5.0, and most preferably at a pH of about 4.4 to about 4.6. The isoelectric wash removes a large amount of water soluble carbohydrates and other water soluble components from the flakes, but removes little of the protein and fiber, thereby forming a soy concentrate. The soy concentrate is dried after the isoelectric wash. In the alcohol leaching process, the soy flake material is washed with an aqueous ethyl alcohol solution wherein ethyl alcohol is present at about 60% by weight. The protein and fiber remain insoluble while the carbohydrate soy sugars of sucrose, stachyose and raffinose are leached from the defatted flakes. The soy soluble sugars in the aqueous alcohol are separated from the insoluble protein and fiber. The insoluble protein and fiber in the aqueous alcohol phase are dried.

Soy protein isolate, as the term is used herein, refers to a soy protein material containing at least about 90% or greater protein content, and preferably from about 92% or greater protein content (mfb). Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted soy protein material or soybean flakes are then placed in an aqueous bath to provide a mixture having a pH of at least about 6.5 and preferably between about 7.0 and 10.0 in order to extract the protein. Typically, if it is desired to elevate the pH above 6.7, various alkaline reagents such as sodium hydroxide, potassium hydroxide and calcium hydroxide or other commonly accepted food grade alkaline reagents may be employed to elevate the pH. A pH of above about 7.0 is generally preferred, since an alkaline extraction facilitates solubilization of the protein. Typically, the pH of the aqueous extract of protein will be at least about 6.5 and preferably about 7.0 to 10.0. The ratio by weight of the aqueous extractant to the vegetable protein material is usually between about 20 to 1 and preferably a ratio of about 10 to 1. In an alternative embodiment, the vegetable protein is extracted from the milled, defatted flakes with water, that is, without a pH adjustment.

It is also desirable in obtaining the soy protein isolate used in the present invention, that an elevated temperature be employed during the aqueous extraction step, either with or without a pH adjustment, to facilitate solubilization of the protein, although ambient temperatures are equally satisfactory if desired. The extraction temperatures which may be employed can range from ambient up to about 120° F. with a preferred temperature of 90° F. The period of extraction is further non-limiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, without the pH adjustment or having a pH of at least 6.5, or preferably about 7.0 to 10, are then precipitated by adjustment of the pH of the extracts to, at or near the isoelectric point of the protein to form an insoluble curd precipitate. The actual pH to which the protein extracts are adjusted will vary depending upon the vegetable protein material employed but insofar as soy protein, this typically is between about 4.0 and 5.0. The precipitation step may be conveniently carried out by the addition of a common food grade acidic reagent such as acetic acid, sulfuric acid, phosphoric acid, hydrochloric acid or with any other suitable acidic reagent. The soy protein precipitates from the acidified extract, and is then separated from the extract. The separated protein may be washed with water to remove residual soluble carbohydrates and ash from the protein material. The separated protein is then dried using conventional drying means to form a soy protein isolate. Soy protein isolates are commercially available from Solae® LLC, for example, as SUPRO® PLUS 675, FXP 950, FXP H0120, SURPO® XT 40, SUPRO® 710 and SUPRO® 720.

Preferably the protein material used in the present invention, is modified to enhance the characteristics of the protein material. The modifications are modifications which are known in the art to improve the utility or characteristics of a protein material and include, but are not limited to, denaturation and hydrolysis of the protein material.

The protein material may be denatured and hydrolyzed to lower the viscosity. Chemical denaturation and hydrolysis of protein materials is well known in the art and typically consists of treating a protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material are: a pH of up to about 10, preferably up to about 9.7; a temperature of about 50° C. to about 80° C. and a time period of about 15 minutes to about 3 hours, where the denaturation and hydrolysis of the protein material occurs more rapidly at higher pH and temperature conditions.

Hydrolysis of the protein material may also be effected by treating the protein material with an enzyme capable of hydrolyzing the protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of protein material, typically from about 0.1% to about 10% enzyme by weight of the protein material, and treating the enzyme and protein dispersion at a temperature, typically from about 5° C. to about 75° C., and a pH, typically from about 3 to about 9, at which the enzyme is active for a period of time sufficient to hydrolyze the protein material. After sufficient hydrolysis has occurred the enzyme is deactivated by heating, and the protein material is precipitated from the solution by adjusting the pH of the solution to about the isoelectric point of the protein material. Enzymes having utility for hydrolysis in the present invention include, but are not limited to, bromelain and alcalase.

Casein protein materials useful in the process of the present invention are prepared by coagulation of a curd from skim milk. The casein is coagulated by acid coagulation, natural souring, or rennet coagulation. To effect acid coagulation of casein, a suitable acid, preferably hydrochloric acid, is added to milk to lower the pH of the milk to around the isoelectric point of the casein, preferably to a pH of from 4.0 to 5.0, and most preferably to a pH of from 4.6 to 4.8. To effect coagulation by natural souring, milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Corn protein materials that are useful in the present invention include corn gluten meal, and most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropyl alcohol.

Wheat protein materials that are useful in the process of the present invention include wheat gluten. Wheat gluten is obtained from conventional wheat refining processes, and is commercially available.

A particularly preferred modified soy protein material is a soy protein isolate that has been enzymatically hydrolyzed and deamidated under conditions that expose the core of the proteins to enzymatic action as described in European Patent No. 0 480 104 B 1, which is incorporated herein by reference. Briefly, the modified protein isolate material disclosed in European Patent No. 0 480 104 B1 is formed by: 1) forming an aqueous slurry of a soy protein isolate; 2) adjusting the pH of the slurry to a pH of from 9.0 to 11.0; 3) adding between 0.01 and 5% of a proteolytic enzyme to the slurry (by weight of the dry protein in the slurry); 4) treating the alkaline slurry at a temperature of 10° C. to 75° C. for a time period effective to produce a modified protein material having a molecular weight distribution (Mn) between 800 and 4000 and a deamidation level of between 5% to 48% (typically between 10 minutes to 4 hours); and deactivating the proteolytic enzyme by heating the slurry above 75° C. The modified protein material disclosed in European Patent No. 0 480 104 B1 is commercially available from Solae, LLC of St. Louis, Mo.

It is necessary to hydrate the protein material (C), prior to preparing the acid beverage. Water is added in sufficient quantity to form a slurry in order to hydrate the protein material. The slurry contains from 5–20% by weight solids based on the weight of the slurry, with the remainder being water. More preferably, the slurry (C) contains from 8–18 by weight solids. Most preferably the slurry (C) contains from 10–15% by weight solids. The slurry is mixed at room temperature under high shear and heated to 140–180° F. for an additional 10 minutes to hydrate the protein. At this solids concentration, the most complete hydration is obtained in the protein. Thus, the water in the slurry is used most efficiently at this concentration.

Once the protein material is hydrated, it then is homogenized. Homogenization serves to decrease the particle size of the protein in the protein slurry (C). Preferably the slurry is transferred to a Gaulin homogenizer (model 15MR) and is homogenized in two stages, a high pressure stage and a low pressure stage. The high pressure stage is from 1500–5000 pounds per square inch and preferably from 2000–3000 pounds per square inch. The low pressure stage is from 300–1000 pounds per square inch and preferably from 400–700 pounds per square inch.

Acid Beverage Compositions

Examples A and B are baseline process examples as defined within FIG. 1. Example A is a 6.25 grams protein per 8 oz serving fortified juice beverage. Example B is a 3.0 grams protein per 8 oz serving fortified juice beverage.

EXAMPLE A

A 6.25 g protein per 8 oz serving fortified juice beverage is made using Supro® Plus 675 made by Solae® LLC.

Added to a vessel are 5494 g of distilled water followed by 332 g of Supro Plus 675. The contents at 5.70% solids are dispersed under medium shear, mixed for 5 minutes, followed by heating to 170° F. for 10 minutes to give a protein suspension slurry. In a separate vessel, 60 grams of pectin (YM-100L) are dispersed into 2940 grams of distilled water under high shear to give a 2% pectin dispersion. The dispersion is heated to 170° F. until no lumps are observed. The pectin dispersion is added into the protein suspension slurry and mixed for 5 minutes under medium shear. This is followed by the addition of 27 grams of citric acid, 27 grams of phosphoric acid, 210 grams of concentrated apple juice and 1000 grams of sugar. The contents are mixed for 5 minutes under medium shear. The pH of this mixture at room temperature is in the range of 3.8–4.0. The contents are pasteurized at 195° F. for 30 seconds, and homogenized at 3000 pounds per square inch in the first stage and 500 pounds per square inch in the second stage to give a protein stabilized acid beverage. Bottles are hot filled with the beverage at 180–185° F. The bottles are inverted, held for 2 minutes and then placed in ice water to bring the temperature of the contents to about room temperature. After the contents of the bottles are brought to about room temperature, the bottles are stored at room temperature for 6 months.

EXAMPLE B

A 3.0 g protein per 8 oz serving fortified juice beverage is made using Supro® Plus 675 made by Solae® LLC.

The procedure of Example A is repeated except that 332g Supro Plus 675 is replaced with 153 g Supro Plus 675 and 7 g of citric acid. The remaining ingredients are utilized at the same amount.

Acid beverages are prepared using the above components (A), (B) and (C) according to the two processes of this invention based on the below generic example.

The stabilizing agent is hydrated in deionized water under high shear for 5 minutes, heated to 170° F. and held for 10 minutes to form (A). A flavoring material (B) is added to the hydrated stabilizing agent (A) to form preblend (I). A sweetener may be added this point or later or a portion of the sweetener added here and also added later. Preferred sweeteners comprise sucrose, corn syrup, and may include dextrose and high fructose corn syrup and artificial sweeteners. It is necessary in the present invention to keep preblend (I) at a pH lower than 7 to eliminate pectin being degraded by beta-elimination. To this end, the pH of preblend (I) is maintained at between 2.0–5.5. A protein material is hydrated in a separate vessel in deionized water under high shear for 5 minutes, minutes, heated to 170° F. and held for 10 minutes. The contents are then subjected to a 2 stage homogenization to form (C). In one embodiment of this invention, preblend (I) and component (C) are combined to form a blend. In another embodiment of the invention, the hydrated stabilizing agent (A) and the hydrated protein material are combined to form preblend (II). Preblend (I) and preblend (II) are combined to form a blend. The blend, by either process is pasteurized at a relatively high temperature for a short period of time. This pasteurization step kills microorganisms in the blend. For example, an effective treatment for killing microorganisms in the blend involves heating the blend to a temperature of about 180° F. for about 10 seconds, preferably to a temperature of at least 190° F. for at least 30 seconds and most preferably at a temperature of 195° F. for 60 seconds. While a temperature lower than 180° F. may work, a temperature of at least 180° F. provides a safety factor. Temperatures greater than 200° F. also have an effect on the killing of microorganisms. However, the cost associated with the higher temperature does not translate to a product that contains appreciably fewer harmful microorganisms. Further, pasteurizing at too high a temperature for too long a period of time may cause the protein to further denature, which generates more sediment due to the insolubility of the further denatured protein.

The (A):(B) weight ratio for forming preblend (I) is generally from 15–45:5–30, preferably from 20–40:8–25 and most preferably from 25–35:10–20. The weight ratio of preblend (I):(C) for forming the acid beverage composition by the first process is generally from 30–60:40–70, preferably from 35–55:45–65 and most preferably from 40–50–50–60. The (A):(C) weight ratio for forming preblend (II) is generally from 60–80:20–40, preferably from 65–75:25–35 and most preferably from 65–73–27–32. Further, the preblend (I):preblend (II) weight ratio is generally from 25–55:45–75, preferably from 30–50:50–70 and most preferably from 35–45–55–65.

Following pasteurization, the blend is subjected to a two stage homogenization. In the first stage, the homogenization pressure is from 8000–30,000 pounds per square inch, preferably from 12,000–25,000 pounds per square inch and most preferably from 15,000–20,000 pounds per square inch. In the second homogenization stage, the first stage product of the acid beverage, after the ultra high pressure stage, is from 300–1000 pounds per square inch and preferably from 400–700 pounds per square inch. During the first homogenization stage of the acid beverage at the ultra-high pressure of up to 30,000 pounds per square inch, a great amount of heat is generated. This heat causes the protein particles to aggregate. The second homogenization stage of the acid beverage serves to break up the aggregation. The homogenized suspension thus formed, is a stable suspension of a protein material in an acidic beverage.

The purpose of an ultra high homogenization is to decrease the particle size of the protein in the finished acid beverage. A decreased protein particle size as well as a decreased stabilizing agent particle size causes the viscosity of the acid beverage to increase. This causes the decreased particle sizes of protein and stabilizing agent to increase in buoyancy. The smaller particle size in conjunction with the increased viscosity causes a decrease in sediment development.

A commercially available homogenizer for use in ultra high pressure homogenization for the present invention is a NIRO NS 3006. The NIRO NS 3006 is especially designed so as to achieve homogenizing valve inlet pressures of up to 30,000 pounds per square inch. Other homogenizers are commercially available that create pressures of in excess of 18,000 pounds per square inch, as well as pressures of up to 30,000 pounds per square inch.

After pasteurization of the acid beverages, but before the ultra-high homogenization step, the mean particle size is greater than 10 µm and the viscosity is 6.8 cps. The ultra high homogenization causes the particle size to be below 3 µm and the viscosity to be above 8 cps.

The blend, by either process, has a pH of from 3.0–4.5, preferably from 3.2–4.0 and most preferably from 3.6–3.8. The bottles are hot filled, inverted for 2 minutes and then placed in ice water to bring the temperature of the contents to about room temperature. The bottles are stored and particle size and viscosity values are determined at 1 month. Sediment values are determined at 1, 2, 4 and 6 months.

The invention having been generally described above, may be better understood by reference to the examples described below. The following examples represent specific but non-limiting embodiments of the present invention.

Examples 1–6 are directed to the preparation of a stabilized acid beverage using components (A) and (B) as defined within FIG. 2.

EXAMPLE 1

A 6.25 g protein per 8 oz serving fortified juice beverage is made using Supro Plus 675 made by Solae LLC.

Added to a vessel are 5400 g of distilled water followed by 332 g of Supro Plus 675. The contents at 6.15% solids are dispersed under medium shear, mixed for 5 minutes followed by heating to 170° F. for 10 minutes to give a protein slurry (C). In a separate vessel, 60 grams of pectin (YM-100L) and 300 grams of sugar are dispersed into 2940 grams of distilled water under high shear to give a 2% pectin slurry (A). The dispersion is heated to 170° F. When the pectin is totally dispersed (without lump), added as (B) are 27 grams of citric acid, 27 grams of phosphoric acid, 210 grams of concentrated apple juice and 700 grams of sugar to form preblend (I). These contents are combined under medium shear, and then mixed for 5 minutes. The solids level of the preblend (I) slurry is at 30%. The protein slurry (C) and preblend (I) are combined and mixed for 5 minutes. The pH at room temperature is in the range of 3.8–4.0. The contents are pasteurized at 195° F. for 30 seconds, and homogenized at 9000 psi in the first stage and 500 psi in the second stage to give a protein stabilized acid beverage. Bottles are hot filled with the beverage at 180–185° F. The bottles are inverted, held for 2 minutes and then placed in ice water to bring the temperature of the contents to about room temperature. After the contents of the bottles are brought to about room temperature, the bottles are stored.

EXAMPLE 2

A 6.25 g protein per 8 oz serving fortified juice beverage is made using Supro Plus 675 made by Solae LLC.

The procedure of Example 1 is repeated except that the first stage homogenization of the acid beverage is increased from 9000 pounds per square inch to 12,000 pounds per square inch.

EXAMPLE 3

A 6.25 g protein per 8 oz serving fortified juice beverage is made using Supro Plus 675 made by Solae LLC.

The procedure of Example 1 is repeated except that the first stage homogenization of the acid beverage is increased from 9000 pounds per square inch to 15,000 pounds per square inch.

EXAMPLE 4

A 3.0 g protein per 8 oz serving fortified juice beverage is made using Supro® Plus 675 made by Solae® LLC.

The procedure for Example 1 is repeated with the following changes: 332 g Supro Plus 675 is replaced with 153 g Supro Plus 675 and 27 g citric acid is replaced with 7 g of citric acid. The remaining ingredients are utilized at the same amount. The first stage homogenization of the blend is 9000 pounds per square inch.

EXAMPLE 5

A 3.0 g protein per 8 oz serving fortified juice beverage is made using Supro® Plus 675 made by Solae® LLC.

The procedure of Example 4 is repeated except that the first stage homogenization of the acid beverage is increased from 9000 pounds per square inch to 12,000 pounds per square inch.

EXAMPLE 6

A 3.0 g protein per 8 oz serving fortified juice beverage is made using Supro Plus 675 made by Solae LLC.

The procedure of Example 4 is repeated except that the first stage homogenization of the acid beverage is increased from 9000 pounds per square inch to 15,000 pounds per square inch.

The baseline process beverage Example A and the inventive process beverage Examples 1–3, all at a 6.25 g protein/8oz serving are compared to each other, in storage sediment values, particle size and viscosity in Tables I–IV. The baseline process beverage Example B and the inventive process beverage Examples 4–6, all at a 3.0 g protein/8oz serving are compared to each other, in storage sediment values, particle size and viscosity in Tables I–IV.

TABLE I

Pressure Effect at One Month

| Example | Particle Size | Viscosity | Sediment 4° C. | Sediment 25° C. |
| --- | --- | --- | --- | --- |
| A | 4.5 μm | 9.0 cps | 4.6 | 5.7 |
| 1 | 2.3 | 8.4 | 4.5 | 2.9 |
| 2 | 2.8 | 10.5 | 3.3 | 4.0 |
| 3 | 1.6 | 12.7 | 1.2 | 0.0 |
| B | 3.8 | 4.7 | 4.6 | 4.7 |
| 4 | 2.4 | 4.4 | 3.4 | 3.5 |
| 5 | 2.0 | 4.4 | 2.8 | 4.00 |
| 6 | 1.6 | 4.3 | 2.3 | 3.5 |

TABLE II

Pressure Effect at Two Months

| Example | Sediment 4° C. | Sediment 25° C. |
| --- | --- | --- |
| A | 6.5 | 9.2 |
| 1 | 4.7 | 4.3 |
| 2 | 3.7 | 4.2 |
| 3 | 1.7 | 1.1 |
| B | 7.9 | 6.0 |
| 4 | 4.3 | 4.4 |
| 5 | 3.8 | 3.8 |
| 6 | 3.8 | 3.3 |

TABLE III

Pressure Effect at Four Months

| Example | Sediment 4° C. | Sediment 25° C. |
| --- | --- | --- |
| A | 9.0 | 12.9 |
| 1 | 5.2 | 5.9 |
| 2 | 4.7 | 4.7 |
| 3 | 2.2 | 2.1 |
| B | 6.4 | 8.7 |
| 4 | 4.8 | 4.8 |
| 5 | 5.3 | 5.4 |
| 6 | 4.3 | 4.8 |

TABLE IV

Pressure Effect at Six Months

| Example | Sediment 4° C. | Sediment 25° C. |
| --- | --- | --- |
| A | 7.6 | 13.2 |
| 1 | 4.3 | 4.4 |
| 2 | 3.2 | 3.2 |
| 3 | 1.1 | 1.1 |
| B | 5.5 | 6.7 |
| 4 | 4.3 | 5.5 |
| 5 | 4.3 | 4.4 |
| 6 | 2.2 | 2.2 |

It is observed from the storage sediment data of the above examples that the embodiments encompassing the process of this invention offer an improvement in smaller particle size, increased viscosity and less sediment in preparing a protein based acid beverage over the normal process for preparing the beverage.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A process for preparing a stable suspension of a protein material in an acidic beverage, comprising;
forming a preblend (I) by mixing
   (A) a hydrated protein stabilizing agent and
   (B) at least one flavoring material comprising a fruit juice, a vegetable juice, citric acid, malic acid, tartaric acid, lactic acid, ascorbic acid, glucono delta lactone or phosphoric acid; and
mixing preblend (I) and
   (C) a hydrated and homogenized protein material slurry wherein the homogenization is carried out in two stages comprising a high pressure stage of from 1500–5000 pounds per square inch and a low pressure stage of from 300–1000 pounds per square inch to form a blend; and
pasteurizing and homogenizing the blend wherein the homogenization of the blend is carried out in two stages comprising a high pressure stage of from 8000–30,000 pounds per square inch and a low pressure stage of from 300–1000 pounds per square inch;
wherein the acid beverage composition has a pH of from 3.0 to 4.5.

2. The process of claim 1 wherein the protein stabilizing agent (A) comprises a hydrocolloid.

3. The process of claim 1 wherein the hydrocolloid comprises alginate, microcrystalline cellulose, jellan gum, tara gum, carrageenan, guar gum, locust bean gum, xanthan gum, cellulose gum and pectin.

4. The process of claim 1 wherein the protein stabilizing agent (A) is a high methoxyl pectin.

5. The process of claim 1, wherein within preblend (I), the weight ratio of (A):(B) is from 15–45:5–30.

6. The process of claim 1, wherein within preblend (I), the weight ratio of (A):(B) is from 20–40:8–25.

7. The process of claim 1, wherein within preblend (I), the weight ratio of (A):(B) is from 25–35:10–20.

8. The process of claim 1 wherein the pH of the protein stabilizing agent (A) is from 2.0–5.5.

9. The process of claim 1, wherein the weight ratio of preblend (I):(C) is from 30–60:40–7.

10. The process of claim 1, wherein the weight ratio of preblend (I):(C) is from 35–55:45–65.

11. The process of claim 1, wherein the weight ratio of preblend (I):(C) is from 40–50:50–60.

12. The composition of claim 1 wherein within (C) the slurry has a solids content of from 5–20% by weight.

13. The composition of claim 1 wherein within (C) the slurry has a solids content of from 8–18% by weight.

14. The composition of claim 1 wherein within (C) the slurry has a solids content of from 10–15% by weight.

15. The process of claim 1 wherein the protein material (C) comprises a soybean protein material, casein, whey protein, wheat gluten or zein.

16. The process of claim 15 wherein the soybean protein material comprises a soy flour, soy concentrate or soy protein isolate.

17. The process of claim 16 wherein the soybean protein material comprises a soy protein isolate.

18. The process of claim 1 wherein within (C) the high pressure stage is from 2000–3000 pounds per square inch.

19. The process of claim 1 wherein within (C) the low pressure stage is from 400–700 pounds per square inch.

20. The process of claim 1 wherein the protein material (C) comprises a hydrolyzed protein material or a non-hydrolyzed protein material.

21. The process of claim 20 wherein the protein material (C) comprises a hydrolyzed protein material.

22. The process of claim 1 wherein the pH of the acid beverage composition is from 3.2–4.0.

23. The process of claim 1 wherein the pH of the acid beverage composition is from 3.6–3.8.

24. The process of claim 1 wherein within the blend, pasteurizing is carried out at a temperature of at least 180° F. for at least 10 seconds.

25. The process of claim 1 wherein within the blend, pasteurizing is carried out at a temperature of at least 190° F. for at least 30 seconds.

26. The process of claim 1 wherein within the blend, pasteurizing is carried out at a temperature of at least 195° F. for at least 60 seconds.

27. The process of claim 1 wherein within the blend, the high pressure stage is from 12,000–25,000 pounds per square inch.

28. The process of claim 1 wherein within the blend, the high pressure stage is from 15,000–20,000 pounds per square inch.

29. A process for preparing a stable suspension of a protein material in an acidic beverage, comprising;
forming a preblend (I) by mixing
   (A) a hydrated protein stabilizing agent and
   (B) at least one flavoring material comprising a fruit juice, a vegetable juice, citric acid, malic acid, tartaric acid, lactic acid, ascorbic acid, glucono delta lactone or phosphoric acid; and
forming a preblend (II) by mixing
   (A) a hydrated protein stabilizing agent; and
   (C) a hydrated and homogenized protein material slurry wherein the homogenization is carried out in two stages comprising a high pressure stage of from 1500–5000 pounds per square inch and a low pressure stage of from 300–1000 pounds per square inch; and
mixing preblend (I) and preblend (II) to form a blend; and
pasteurizing and homogenizing the blend wherein the homogenization of the blend is carried out in two stages comprising a high pressure stage of from 8000–30,000 pounds per square inch and a low pressure stage of from 300–1000 pounds per square inch;
wherein the acid beverage composition has a pH of from 3.0 to 4.5.

30. The process of claim 29 wherein the protein stabilizing agent (A) comprises a hydrocolloid.

31. The process of claim 29 wherein the hydrocolloid comprises alginate, microcrystalline cellulose, jellan gum, tara gum, carrageenan, guar gum, locust bean gum, xanthan gum, cellulose gum and pectin.

32. The process of claim 29 wherein the protein stabilizing agent (A) is a high methoxyl pectin.

33. The process of claim 29, wherein within preblend (I), the weight ratio of (A):(B) is from 15–45:5–30.

34. The process of claim 29, wherein within preblend (I), the weight ratio of (A):(B) is from 20–40:8–25.

35. The process of claim 29, wherein within preblend (I), the weight ratio of (A):(B) is from 25–35:10–20.

36. The process of claim 29 wherein the pH of the protein stabilizing agent (A) is from 2.0–5.5.

37. The process of claim 29, wherein within preblend (II), the weight ratio of (A):(C) is from 60–80:20–40.

38. The process of claim 29, wherein within preblend (II), the weight ratio of (A):(C) is from 65–75:25–35.

39. The process of claim 29, within preblend (II), the weight ratio of (A):(C) is from 65–73:27–32.

40. The process of claim 29 wherein within (C) the slurry has a solids content of from 5–20% by weight.

41. The process of claim 29 wherein within (C) the slurry has a solids content of from 8–18% by weight.

42. The process of claim 29 wherein within (C) the slurry has a solids content of from 10–15% by weight.

43. The process of claim 29 wherein the protein material (C) comprises a soybean protein material, casein, whey protein, wheat gluten or zein.

44. The process of claim 43 wherein the soybean protein material comprises a soy flour, soy concentrate or soy protein isolate.

45. The process of claim 44 wherein the soybean protein material comprises a soy protein isolate.

46. The process of claim 29 wherein within (C) the high pressure stage is from 2000–3000 pounds per square inch.

47. The process of claim 29 wherein within (C) the low pressure stage is from 400–700 pounds per square inch.

48. The process of claim 29 wherein the protein material (C) comprises a hydrolyzed protein material or a non-hydrolyzed protein material.

49. The process of claim 48 wherein the protein material (C) comprises a hydrolyzed protein material.

50. The process of claim 29 wherein the weight ratio of preblend (I):preblend (II) is from 25–55:45–75.

51. The process of claim 29 wherein the weight ratio of preblend (I):preblend (II) is from 30–50:50–70.

52. The process of claim 29 wherein the weight ratio of preblend (I):preblend (II) is from 35–45:55–65.

53. The process of claim 29 wherein the pH of the acid beverage composition is from 3.2–4.0.

54. The process of claim 29 wherein the pH of the acid beverage composition is from 3.6–3.8.

55. The process of claim 29 wherein within the blend, pasteurizing is carried out at a temperature of at least 180° F. for at least 10 seconds.

56. The process of claim 29 wherein within the blend, pasteurizing is carried out at a temperature of at least 190° F. for at least 30 seconds.

57. The process of claim 29 wherein within the blend, pasteurizing is carried out at a temperature of at least 195° F. for at least 60 seconds.

58. The process of claim 29 wherein within the blend, the high pressure stage is from 12,000–25,000 pounds per square inch.

59. The process of claim 29 wherein within the blend, the high pressure stage is from 15,000–20,000 pounds per square inch.

* * * * *